(12) United States Patent
Kwon et al.

(10) Patent No.: US 8,952,905 B2
(45) Date of Patent: Feb. 10, 2015

(54) IMAGE DISPLAY APPARATUS AND METHOD FOR OPERATING THE SAME

(75) Inventors: Youk Kwon, Seoul (KR); Joomin Kim, Seoul (KR); Gyuseung Kim, Seoul (KR); Janghee Lee, Seoul (KR); Jaekyung Lee, Seoul (KR); Youngwan Lim, Seoul (KR); Sijin Kim, Seoul (KR); Kunsik Lee, Seoul (KR); Sanghyun Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 13/351,981

(22) Filed: Jan. 17, 2012

(65) Prior Publication Data

US 2012/0194430 A1    Aug. 2, 2012

Related U.S. Application Data

(60) Provisional application No. 61/437,667, filed on Jan. 30, 2011.

(51) Int. Cl.
| | |
|---|---|
| *G06F 3/01* | (2006.01) |
| *G06F 3/16* | (2006.01) |
| *G06F 3/0346* | (2013.01) |
| *H04N 21/422* | (2011.01) |
| *H04N 21/431* | (2011.01) |
| *H04N 21/442* | (2011.01) |
| *H04N 21/482* | (2011.01) |
| *G06F 3/0488* | (2013.01) |

(52) U.S. Cl.
CPC .......... *G06F 3/0346* (2013.01); *G06F 3/04886* (2013.01); *G06F 3/16* (2013.01); *G06F 3/04883* (2013.01); *H04N 21/42222* (2013.01); *H04N 21/4312* (2013.01); *H04N 21/44218* (2013.01); *H04N 21/482* (2013.01)
USPC ........... 345/173; 345/157; 715/702; 715/268; 178/18.03

(58) Field of Classification Search
CPC . G06F 3/033; G06F 3/04883; G06F 3/04886; G06F 3/016
USPC .......... 345/179, 660, 157, 173; 715/268, 780, 715/702; 178/18.03
See application file for complete search history.

(56) References Cited

U.S. PATENT DOCUMENTS

| | | | | |
|---|---|---|---|---|
| 5,850,477 | A | * | 12/1998 | Takada .......................... 382/186 |
| 5,894,306 | A | * | 4/1999 | Ichimura ....................... 345/418 |
| 6,064,421 | A | * | 5/2000 | Pohl ........................... 348/14.01 |
| 6,088,481 | A | * | 7/2000 | Okamoto et al. ............. 382/189 |
| 6,522,347 | B1 | * | 2/2003 | Tsuji et al. .................... 715/848 |
| 7,119,796 | B2 | * | 10/2006 | Van Dam et al. ............. 345/173 |
| 8,232,969 | B2 | * | 7/2012 | Grant et al. ................... 345/173 |
| 8,327,282 | B2 | * | 12/2012 | Arscott et al. ................ 715/769 |

(Continued)

*Primary Examiner* — Michael J Eurice
(74) *Attorney, Agent, or Firm* — Birch, Stewart, Kolasch & Birch, LLP

(57) ABSTRACT

According to an embodiment of the present invention, a method for operating an image display device using a pointing device includes displaying, on a display of the image display device, a handwriting region, receiving a pointing signal from the pointing device, determining whether a location of an image based on positional information corresponding to the received pointing signal is included in the handwriting region, and displaying the image corresponding to the received pointing signal at a boundary area of the handwriting region closest to the location when the location of the image is determined to be not included in the handwriting region.

20 Claims, 12 Drawing Sheets

(56) References Cited

U.S. PATENT DOCUMENTS

| | | | |
|---|---|---|---|
| 8,327,296 B2* | 12/2012 | Arscott et al. | 715/863 |
| 8,359,535 B2* | 1/2013 | Watanabe et al. | 715/702 |
| 8,373,665 B2* | 2/2013 | Comerford | 345/173 |
| 2002/0008692 A1* | 1/2002 | Omura et al. | 345/173 |
| 2002/0015064 A1* | 2/2002 | Robotham et al. | 345/863 |
| 2002/0107885 A1* | 8/2002 | Brooks et al. | 707/505 |
| 2002/0190963 A1* | 12/2002 | Van Dam et al. | 345/173 |
| 2005/0259084 A1* | 11/2005 | Popovich et al. | 345/173 |
| 2006/0109256 A1* | 5/2006 | Grant et al. | 345/173 |
| 2006/0114239 A1* | 6/2006 | Nakajima | 345/173 |
| 2006/0119586 A1* | 6/2006 | Grant et al. | 345/173 |
| 2007/0182718 A1* | 8/2007 | Schoener et al. | 345/173 |
| 2007/0227785 A1* | 10/2007 | Katsurahira | 178/18.07 |
| 2008/0129712 A1* | 6/2008 | Nguyen | 345/179 |
| 2009/0021530 A1* | 1/2009 | Ishiguro | 345/619 |
| 2009/0054123 A1* | 2/2009 | Mityagin et al. | 463/9 |
| 2009/0155750 A1* | 6/2009 | Abe | 434/169 |
| 2009/0201248 A1* | 8/2009 | Negulescu et al. | 345/157 |
| 2009/0227296 A1* | 9/2009 | Kim | 455/566 |
| 2010/0315345 A1* | 12/2010 | Laitinen | 345/173 |
| 2010/0328223 A1* | 12/2010 | Mockarram-Dorri et al. | 345/173 |

\* cited by examiner (a)

(b)

(c)

(d)

(a)

(b)

IMAGE DISPLAY APPARATUS AND METHOD FOR OPERATING THE SAME

CROSS-REFERENCE TO RELATED APPLICATION

This application claims benefit of priority of U.S. Provisional Application No. 61/437,667 filed on Jan. 30, 2011 in the USPTO, the disclosure of which is incorporated herein by reference.

BACKGROUND OF THE INVENTION

1. Field of the Invention

The present invention relates to an image display device and a method for operating the same, and more particularly to an image display device, which can perform an operation corresponding to user intention using a pointing device, and a method for operating the same.

2. Description of the Related Art

An image display device is an apparatus that can display a broadcast signal, a user input signal, a moving image signal, a signal transmitted from a web server, and the like on a display. Specifically, the image display device displays a broadcast selected by the user from among broadcasts transmitted from broadcasting stations. Currently, broadcasting is transitioning from analog broadcasting to digital broadcasting throughout the world.

Digital broadcasting transmits digital audio and video signals. Digital broadcasting offers many advantages over analog broadcasting. The advantages include robustness against noise, less data loss, and easier error correction. Also, the digital broadcasting provides clearer and high-definition images. In addition, digital broadcasting allows interactive viewer services which analog broadcasting does not provide.

A remote control device such as a remote controller separated from the image display device is used to operate the image display device. There has been a need to add various functions to the remote control device as the image display device have become to perform various operations. Various methods for increasing user convenience have been studied.

In addition, there is a need to provide a method for performing handwriting recognition while providing a convenient handwriting recognition method to the user.

SUMMARY OF THE INVENTION

Therefore, the present invention has been made in view of the above problems, and it is an object of the present invention to provide an image display device, which can provide a convenient handwriting recognition method to a user using a pointing signal transmitted from a pointing device, and a method for operating the same.

In accordance with an aspect of the present invention, the above and other objects can be accomplished by the provision of a method for operating an image display device using a pointing device, the method including displaying a handwriting region, receiving a pointing signal from the pointing device, displaying an image at coordinates corresponding to the received pointing signal when the coordinates are included in the handwriting region, and displaying an image in a boundary position closest to the coordinates corresponding to the received pointing signal in a boundary region of the handwriting region when the coordinates are not included in the handwriting region.

In accordance with another aspect of the present invention, there is provided a method for operating an image display device using a pointing device, the method including displaying a handwriting region, receiving a pointing signal from the pointing device, displaying a first pointer moving at a first movement speed according to the pointing signal when coordinates corresponding to the received pointing signal are not included in the handwriting region, and displaying a second pointer moving at a second movement speed according to the pointing signal when coordinates corresponding to the received pointing signal are included in the handwriting region.

In accordance with another aspect of the present invention, there is provided an image display device using a pointing device, the image display device including a display configured to display a handwriting region, an interface configured to receive a pointing signal from the pointing device, and a controller configured to perform a control operation for displaying an image at coordinates corresponding to the pointing signal received through the interface when the coordinates are included in the handwriting region and a control operation for displaying an image in a boundary position closest to the coordinates corresponding to the received pointing signal in a boundary region of the handwriting region when the coordinates are not included in the handwriting region.

In accordance with another aspect of the present invention, there is provided an image display device using a pointing device, the image display device including a display configured to display a handwriting region, an interface configured to receive a pointing signal from the pointing device, and a controller configured to perform a control operation for displaying a first pointer moving at a first movement speed according to the pointing signal when coordinates corresponding to the received pointing signal are not included in the handwriting region and a control operation for displaying a second pointer moving at a second movement speed on the display according to the pointing signal when coordinates corresponding to the received pointing signal are included in the handwriting region.

According to an embodiment of the present invention, a method for operating an image display device using a pointing device includes displaying, on a display of the image display device, a handwriting region, receiving a pointing signal from the pointing device, determining whether a location of an image based on positional information corresponding to the received pointing signal is included in the handwriting region, and displaying the image corresponding to the received pointing signal at a boundary area of the handwriting region closest to the location when the location of the image is determined to be not included in the handwriting region.

According to an embodiment of the present invention, a method for operating an image display device using a pointing device includes displaying, on a display of the image display device, a handwriting region, receiving a pointing signal from the pointing device, determining whether or not a pointing signal trajectory is determined to correspond to a specific character, and displaying a list of operations associated with the specific character on an area adjacent to the handwriting region when the pointing signal trajectory corresponds to the specific character.

According to an embodiment of the present invention, a method for operating an image display device using a pointing device includes displaying, on a display of the image display device, a handwriting region, determining whether or not a pointing signal trajectory on the handwriting region corresponds to at least part of multiple characters, displaying a list of operations associated with the multiple characters on an area adjacent to the handwriting region when the pointing signal trajectory corresponds to the at least a part of multiple characters, and updating the list of operations on the area adjacent to the handwriting region as the pointing signal trajectory changes.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
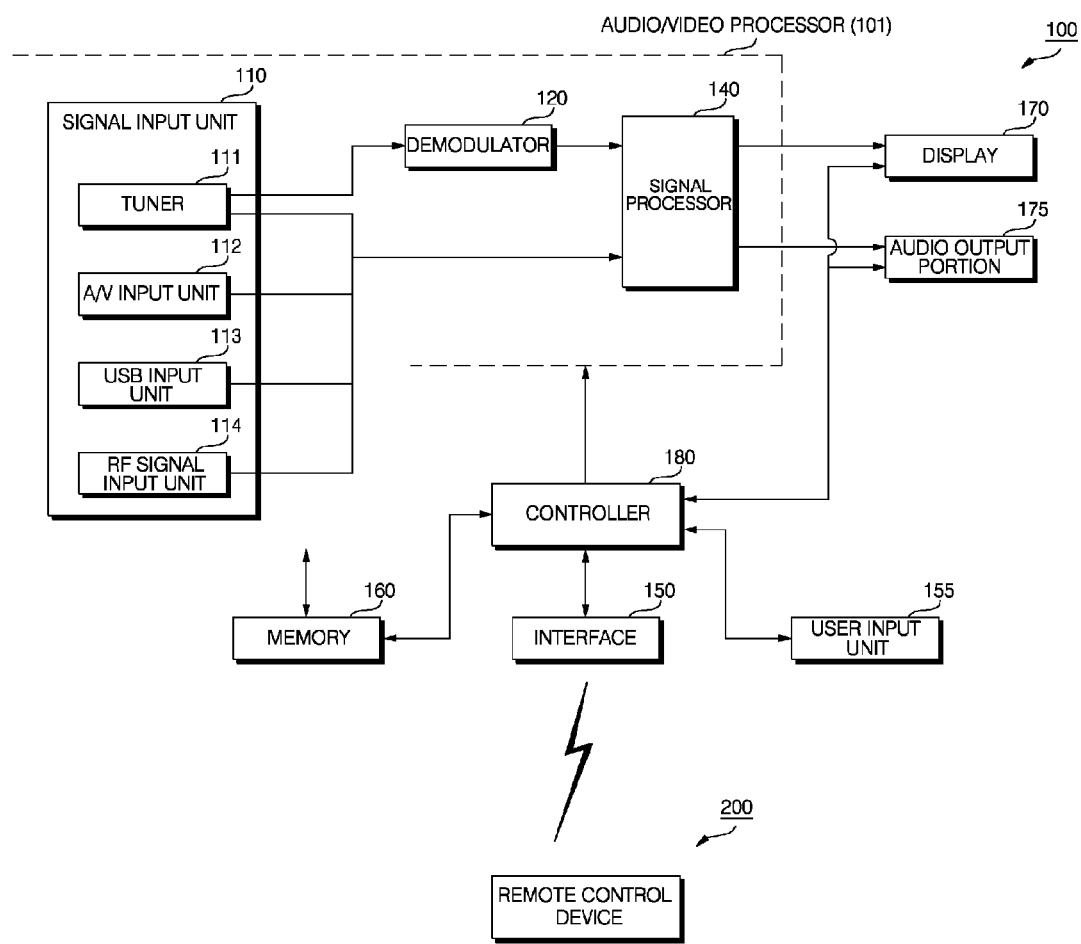
FIG. 1 is a block diagram showing the internal configuration of an image display device according to an embodiment of the present invention.

FIG. 1 is a block diagram showing the internal configuration of an image display device according to an embodiment of the present invention.

Referring to FIG. 1, an image display apparatus 100 includes an audio/video (A/V) processor 101, an interface 150, a memory 160, a display 170, an audio output portion 175 and a controller 180.

The A/V processor 101 processes an input audio or video signal so that an image or voice may be output to the display 170 or the audio output portion 175 of the image display device 100. For the video or audio processing, the A/V processor 101 may include a signal input unit 110, a demodulator 120, and a signal processor 140. The signal input unit 110 may include one or more tuners 111, an A/V input unit/module 112, a Universal Serial Bus (USB) input unit/module 113, and a radio frequency (RF) signal input unit/module 114.

The tuners 111 select a Radio Frequency (RF) broadcast signal corresponding to a channel selected by a user from among a plurality of RF broadcast signals received through an antenna and downconverts the selected RF broadcast signal into an Intermediate Frequency (IF) signal or a baseband audio or video signal. For example, if the selected RF broadcast signal is a digital broadcast signal, the tuner 111 downconverts the RF broadcast signal to a Digital IF (DIF) signal. If the selected RF broadcast signal is an analog broadcast signal, the tuner 111 downconverts the RF broadcast signal to an analog baseband video or audio signal (Composite Video Banking Sync (CVBS)/Sound Intermediate Frequency (SIF)). That is, the tuner 111 is capable of processing a digital or analog broadcast signal. The analog baseband video or audio signal (CVBS/SIF) output from the tuner 111 may be provided directly to the signal processor 140. The tuner 111 may receive a single-carrier RF broadcast signal based on Advanced Television System Committee (ATSC) or a multi-carrier RF broadcast signal based on Digital Video Broadcasting (DVB).

In accordance with another embodiment of the present invention, the image display device 100 may include at least two tuners. If the image display device 100 includes at least two tuners, a second tuner also selects an RF broadcast signal of a user-selected channel from among RF broadcast signals received through the antenna and downconverts the selected RF broadcast signal to an IF signal or a baseband video or audio signal. Also, the second tuner may sequentially select RF signals of all broadcast channels that have been stored by a channel memory function and downconvert the selected RF signals to IF signals or baseband video or audio signals. Here, the second tuner may perform downconversion of the RF signals of all broadcast channels periodically.

Hence, the image display device 100 may provide video signals of a plurality of channels downconverted by the second tuner as thumbnail images, while displaying the video of a broadcast signal downconverted by the first tuner. In this case, the first tuner may downconvert a user-selected main RF broadcast signal to an IF signal or a baseband video or audio signal, and the second tuner may sequentially/periodically select all RF broadcast signals except for the main RF broadcast signal and downconvert the selected RF broadcast signals to IF signals or baseband video or audio signals.

The demodulator 120 demodulates the DIF signal received from the tuner 111. For example, if the DIF signal output from the tuner 111 is an ATSC signal, the demodulator 120 demodulates the DIF signal by 8-Vestigal Side Band (8-VSB). In another example, if the DIF signal output from the tuner 111 is a DVB signal, the demodulator 120 demodulates the DIF signal by Coded Orthogonal Frequency Division Multiple Access (COFDMA) demodulation.

Further, the demodulator 120 may perform a channel decoding. For the channel decoding, the demodulator 120 may include a Trellis decoder, a deinterleaver, and a Reed Solomon decoder, for Trellis decoding, deinterleaving and Reed Solomon decoding, respectively.

After the demodulation and channel decoding, the demodulator 120 may output a Transport Stream (TS) signal. A video signal, an audio signal, or a data signal may be multiplexed in the TS signal. For example, the TS signal may be a Moving Picture Experts Group-2 (MPEG-2) TS that includes a multiplexed MPEG-2 video signal and a Dolby AC-3 audio signal. Specifically, the MPEG-2 TS may include a 4-byte header and 184-byte payload. Thereafter the TS signal output from the demodulator 120 may be provided to the signal processor 140. The signal processor 140 demultiplexes and processes the TS signal and outputs a video signal to the display 170 and an audio signal to the audio output portion 175. An image display device having at least two tuners may have two demodulators. Preferably, a number of demodulators corresponds to a number of tuners, for example. Also, a demodulator may be separately provided for ATSC and DVB.

The signal input unit 110 may connect the image display device 100 to an external device. Here, the external device can be a digital versatile disc (DVD) player, a Blu-ray player, a game player, a camcorder, a computer (laptop computer), etc. The signal input unit 110 sends an external input video signal, an external input audio signal and an external input data signal to the signal processor 140 of the image display device 100. The signal input unit 110 also outputs an audio, video or data signal processed in the image display device 100 to another external device.

In the signal input unit 110, the AN input module 112 may include a composite video banking sync (CVBS) port, a component port, an S-video port (analog), a Digital Visual Interface (DVI) port, a High Definition Multimedia Interface (HDMI) port, a Red, Green, Blue (RGB) port, a D-SUB port, an Institute of Electrical and Electronics Engineers (IEEE) 1394 port, a Sony/Phillips Digital InterFace (SPDIF) port, a Liquid HD port, etc. in order to provide audio and video signals received from the external device to the image display device 100. Then, analog signals received through the CVBS port and the S-video port may be provided to the signal processor 140 after analog-to-digital conversion and digital signals received through the other input ports may be provided to the signal processor 140 without analog-to-digital conversion.

The USB input module 113 may receive audio and video signals through the USB port.

The RF signal input module 114 may connect the image display device 100 to a wireless network. The image display device 100 may access the wireless Internet or other network through the RF signal input module 114. To connect to the wireless Internet, a communication standard, such as Wireless Local Area Network (WLAN) (Wi-Fi), Wireless Broadband (WiBro), Worldwide Interoperability for Microwave Access (Wimax), High Speed Downlink Packet Access (HSDPA), etc. may be used. Further, the RF signal input module 114 may conduct short-range communications with another electronic device. For example, the RF signal input module 114 may be networked to another electronic device by a communication standard like a Bluetooth, a Radio Frequency Identification (RFID), an InfraRed Data Association (IrDA), an Ultra Wideband (UWB), a ZigBee, etc.

The signal input unit 110 may connect the image display device 100 and a set-top box. For instance, if the set-top box is Internet Protocol (IP) TV capable, the signal input unit 110 may transmit an audio, video or data signal received from the IPTV set-top box to the signal processor 140 and a processed signal received from the signal processor 140 to the IP TV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (FTTH-TV), TV over DSL, Video over DSL, TV over IP (TVIP), Broadband TV (BTV), and Internet TV and full-browsing TV which are capable of providing Internet access services.

The signal processor 140 may demultiplex a received TS signal including an MPEG-2 TS into an audio signal, a video signal and a data signal. The signal processor 140 may also process the demultiplexed video signal. For instance, if the demultiplexed video signal was coded, the signal processor 140 may decode the coded video signal. More specifically, if the demultiplexed video signal is an MPEG-2 coded video signal, an MPEG-2 decoder may decode the demultiplexed video signal. If the demultiplexed video signal was coded in compliance with H.264 for Digital Multimedia Broadcasting (DMB) or Digital Video Broadcasting-Handheld (DVB-H), an H.264 decoder may decode the demultiplexed video signal.

Also, the signal processor 140 may control a brightness, a tint, and a color for the video signal. The video signal processed by the signal processor 140 is displayed on the display 170 (the signal processor 140 may also process the demultiplexed audio signal).

For example, if the demultiplexed audio signal was coded, the signal processor 140 may decode the audio signal. More specifically, if the demultiplexed audio signal is an MPEG-2 coded audio signal, an MPEG-2 decoder may decode the demultiplexed audio signal. If the demultiplexed audio signal was coded in compliance with MPEG 4 Bit Sliced Arithmetic Coding (BSAC) for terrestrial DMB, an MPEG 4 decoder may decode the demultiplexed audio signal. If the demultiplexed audio signal was coded in compliance with MPEG 2 Advanced Audio Codec (AAC) for satellite DMB or DVB-H, an AAC decoder may decode the demultiplexed audio signal. Further, the signal processor 140 may control a bass, a treble, and a volume of the audio signal. Thereafter, the audio signal processed by the signal processor 140 is provided to the audio output portion 175.

Also, the signal processor 140 may process the demultiplexed data signal. For example, if the demultiplexed data signal was coded, the signal processor 140 may decode the data signal. The coded data signal may be Electronic Program Guide (EPG) information including broadcasting information such as the starts, ends, etc. of broadcast programs of each channel. For instance, the EPG information may be ATSC-Program and System Information Protocol (ATSC-PSIP) information in case of ATSC. In case of DVB, the EPG information may include DVB-Service Information (DVB-SI). The ATSC-PSIP information or DVB-SI may be included in the 4-byte header of the afore-described TS, i.e. MPEG-2 TS.

In addition, the signal processor 140 may perform an On-Screen Display (OSD) function. Specifically, the signal processor 140 may display graphic or text information on the display 170 based on at least one of the processed video and data signals and a user input signal received through a remote control device 200.

Referring to FIG. 1, the memory 160 may store programs for signal processing and control operations of the controller 180, and store processed video, audio or data signals. Also, the memory 160 may temporarily store video, audio or data signals received through the signal input unit 110. The memory 160 may include a storage medium of at least one type of flash memory, hard disk, multimedia card micro type, card-type memory (e.g. Secure Digital (SD) or eXtreme Digital (XD) memory), an optical disk, a removable storage such as a memory stick, Random Access Memory (RAM), and Read Only Memory (ROM) (e.g. Electrically Erasable Programmable ROM (EEPROM)). When a user selects a file to be reproduced, the image display device 100 may reproduce a file stored in the memory 160 (e.g. a moving image file, a still image file, a music file, a text file, etc.) and provide the file to the user.

The controller 180 provides overall control to the image display device 100. The controller 180 may receive a signal from the remote control device 200 via the interface 150. When the user inputs a command input to the remote controller 200, the controller 180 identifies the command input using the received signal and controls the image display device 100 according to the command input. For example, upon receiving a predetermined channel selection command from the user, the controller 180 controls the tuner 111 to provide a selected channel through the signal input unit 110, the signal processor 140 to process the audio and video signals for the selected channel, and the signal processor 140 to output user-selected channel information along with the processed audio and video signals to the display 170 or the audio output portion 175.

Further, the user may enter a different-type video or audio output command through the remote control device 200. For example, if the user wants to view an image from a camera or a camcorder received through the USB input module 113, instead of a broadcast signal, the controller 180 may control the A/V processor 101 and the signal processor 140 to process an audio or video signal received through the USB input module 113 of the signal receiver 110. Then, the controller 180 may output the processed audio and/or video signal to the display 170 and/or the autio output portion 175.

In addition to commands received through the remote control device 200, the controller 180 may also identify a user command received through the user input unit 155 provided to the image display device 100 and control the image display device 100 according to the user command. For example, the user may input other commands such as an on/off command, a channel switch command, a volume change command, or the like to the image display device 100 through the user input unit 155. The user input unit 155 may include buttons or keys formed on the image display device 100 or may be a keyboard a touch screen, a key pad, a stylus, a mouse, etc. The controller 180 determines whether the user input unit 155 has been manipulated and controls the image display device 100 according to the determination result. The image display device 100 can be, e.g., a digital TV, a smart TV, a computer, a notebook, a portable multimedia device, a mobile terminal such as a smart phone, a navigation device, etc.

Figure 2A:
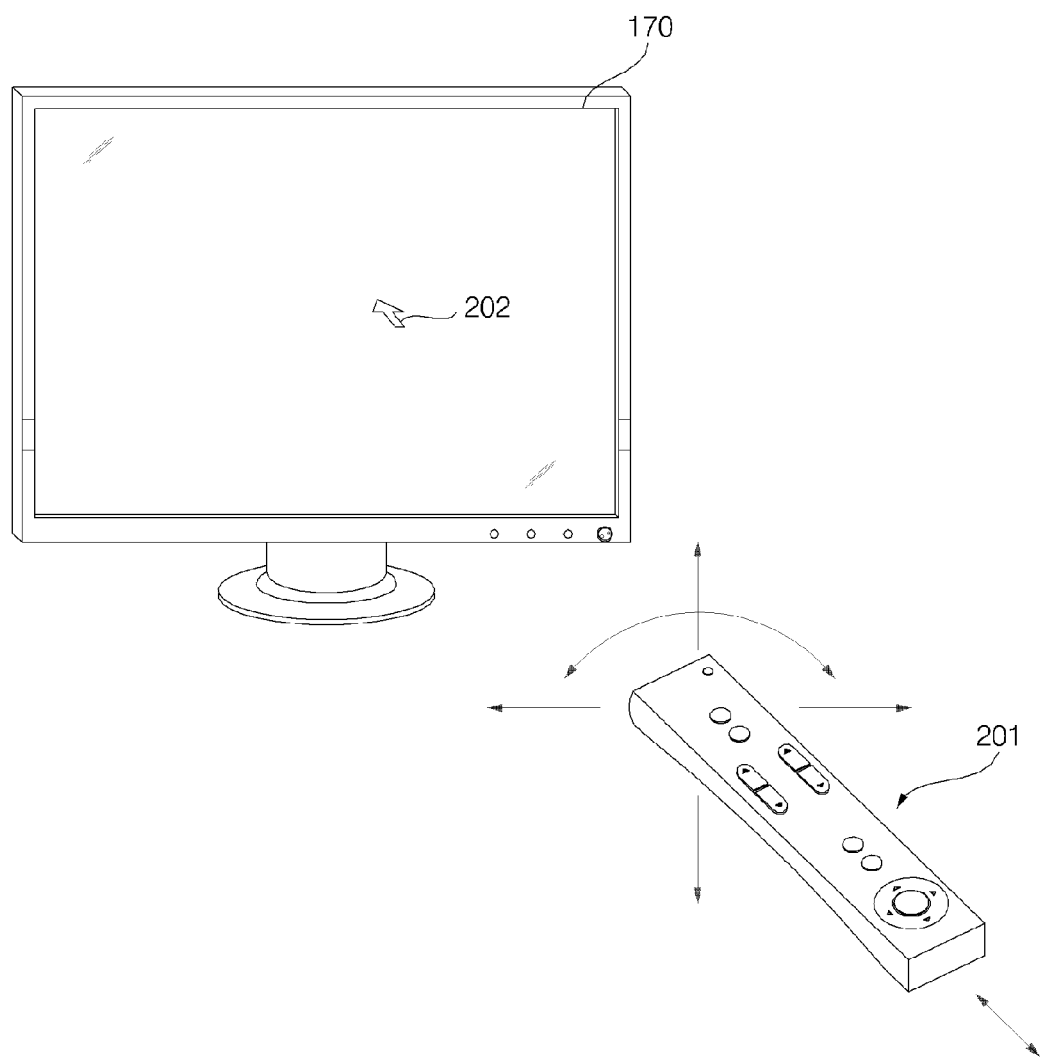
FIGS. 2A and 2B are perspective views of an image display device and a pointing device that can input a command to the image display device according to an embodiment of the present invention.
Figure 2B:
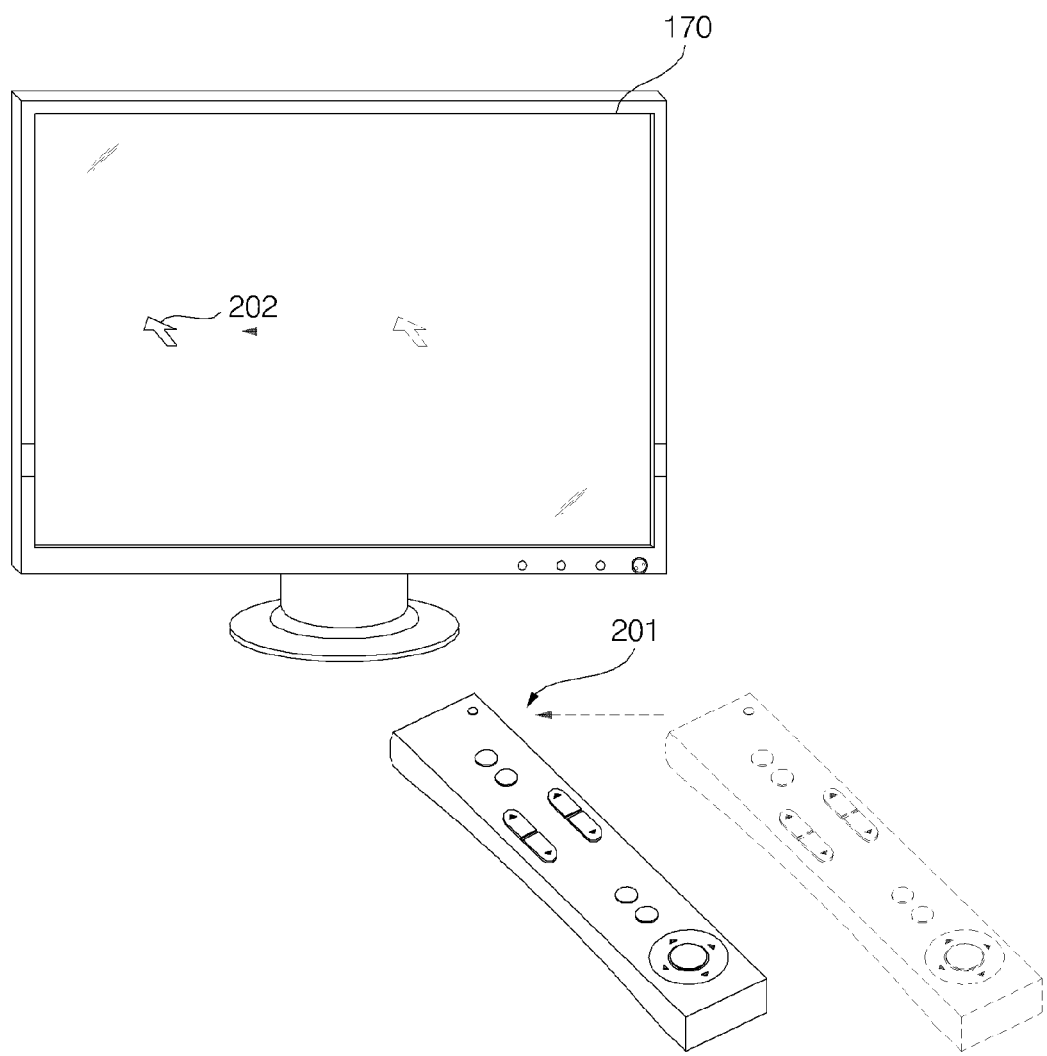

FIGS. 2A and 2B are perspective views of an image display device 100 and a pointing device 201 able to input a command to the image display device according to an embodiment of the present invention.

The pointing device 201 is an example of the remote control device 200 for entering a command for the image display device 100. In accordance with the embodiment of the present invention, the pointing device 201 transmits and receives signals to and from the image display device 100 in compliance with an RF communication standard. As shown in FIG. 2A, a pointer 202 may be displayed on a screen of a display 170 of the image display device 100 in correspondence with the pointing device 201.

The user may rotate the pointing device 201 or move the pointing device 201 up, down, left, right, forward or backward. The pointer 202 moves on the image display device 100 in correspondence with the movement or rotation of the pointing device 201.

FIG. 2B illustrates a movement of the pointer 202 on the screen of the image display device 100 according to a movement of the pointing device 201. Referring to FIG. 2B, when the user moves the pointing device 201 to the left, the pointer 202 also moves to the left on the image display device 100. In accordance with the embodiment of the present invention, the pointing device 201 includes a sensor for sensing the movement of the pointing device 201. Thus, information about the movement of the pointing device 201 sensed by the sensor is provided to the image display device 100. Then, the image display device 100 determines the movement of the pointing device 201 based on the information about the movement of the pointing device 201 and calculates the coordinates of the pointer 202 corresponding to the movement of the pointing device 201.

Here, the pointer 202 displayed on the display 170 moves in correspondence with an upward, downward, left or right movement or rotation of the pointing device 201. The velocity or direction of the pointer 202 may correspond to that of the pointing device 201. In accordance with the embodiment of the present invention, the pointer 202 is set to move on the image display device 100 in correspondence with the movement of the pointing device 201. It can be further contemplated as another embodiment of the present invention that a particular movement of the pointing device 201 triggers a predetermined command to the image display device 100. For example, if the pointing device 201 moves forward or backward, an image displayed on the image display device 200 may be enlarged or contracted. Therefore, the embodiment of the present invention does not limit the scope of the present invention.

Figure 3A:
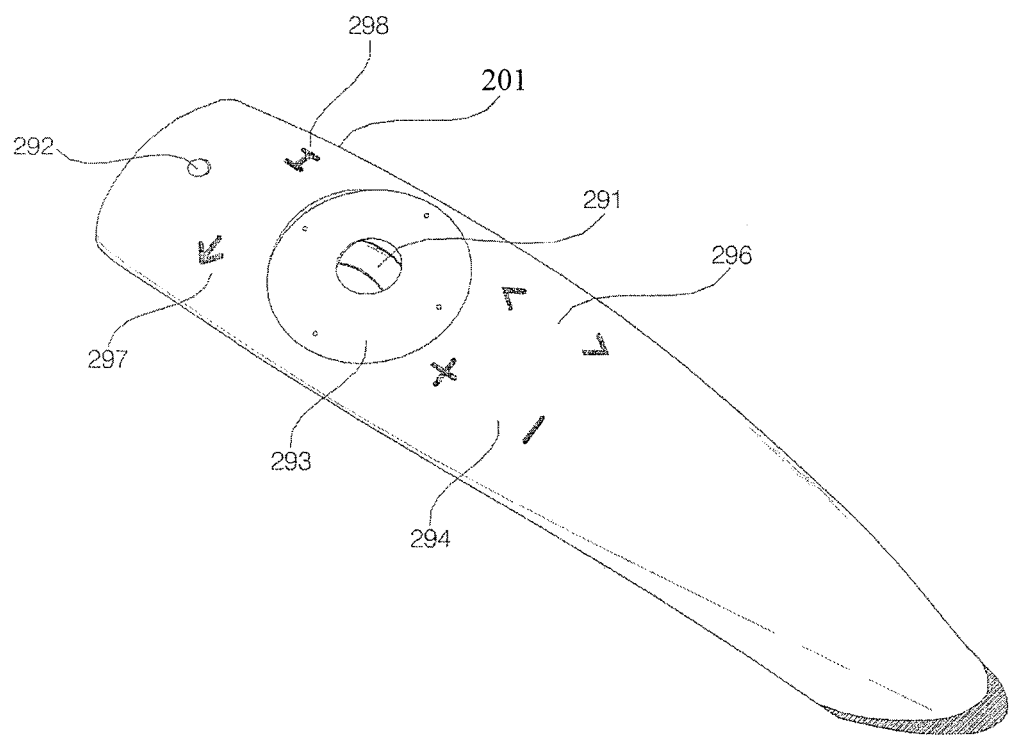
FIG. 3A shows an example of the pointing device 201 according to an embodiment of the present invention.

FIG. 3A illustrates an example of the pointing device 201 according to an embodiment of the present invention. Referring to FIG. 3A, the pointing device 201 according to the embodiment of the present invention may include various input keys, input buttons, etc. For example, the pointing device 201 may include an okay/enter/select key 291, a menu key 292, a 4-direction key 293, a channel control key 294, and a volume control key 296. The pointing device 201 is an example of the remote control device 200.

For example, the okay/enter/select key 291 may be used to select a menu or item, the menu key 292 may be used to display a predetermined menu, the 4-direction key 294 may be used to move a pointer 202 or indicator up, down, left and right, the channel control key 294 may be used to move a channel up or down, and the volume control key 296 may be used for volume control. The pointing device 201 may further include a back key 297 and a home key 298. For example, the back key 297 may be used to move a screen to a previous screen and the home key 298 may be used to move a screen to a home screen.

As shown in FIG. 3A, the okay/enter/select key 291 may further include a scroll function. For the scroll function, the okay/enter/select key 291 may be implemented as a wheel key. That is, by pushing the okay/enter/select key 291, a menu or item is selected. When the okay key 291 is scrolled up or down, a display screen is scrolled or a list page is switched in accordance with the scrolled action of the okay/enter/select key 291.

More specifically, for example, when an image having a size greater than the size of the display is displayed on the display 170, the user may scroll the okay/enter/select key 291 to view and to display an image region of the image which is not currently displayed on the display. Further, a list page is displayed on the display 170, the user may scroll the okay/enter/select key 291 to view and display a previous page or a next page of a current page. Such a scroll function may be included separately from the okay/enter/select key 291.

Referring to FIG. 3A, four-direction key 293 may include up, down, left and right keys in a circular shape. Further, the four-direction key 293 may be configured to receive a touch input. For example, if a touch operation from the up key to the down key in the four-direction key 293 is performed, a predetermined function may be input or performed according to the touch input.

Figure 3B:
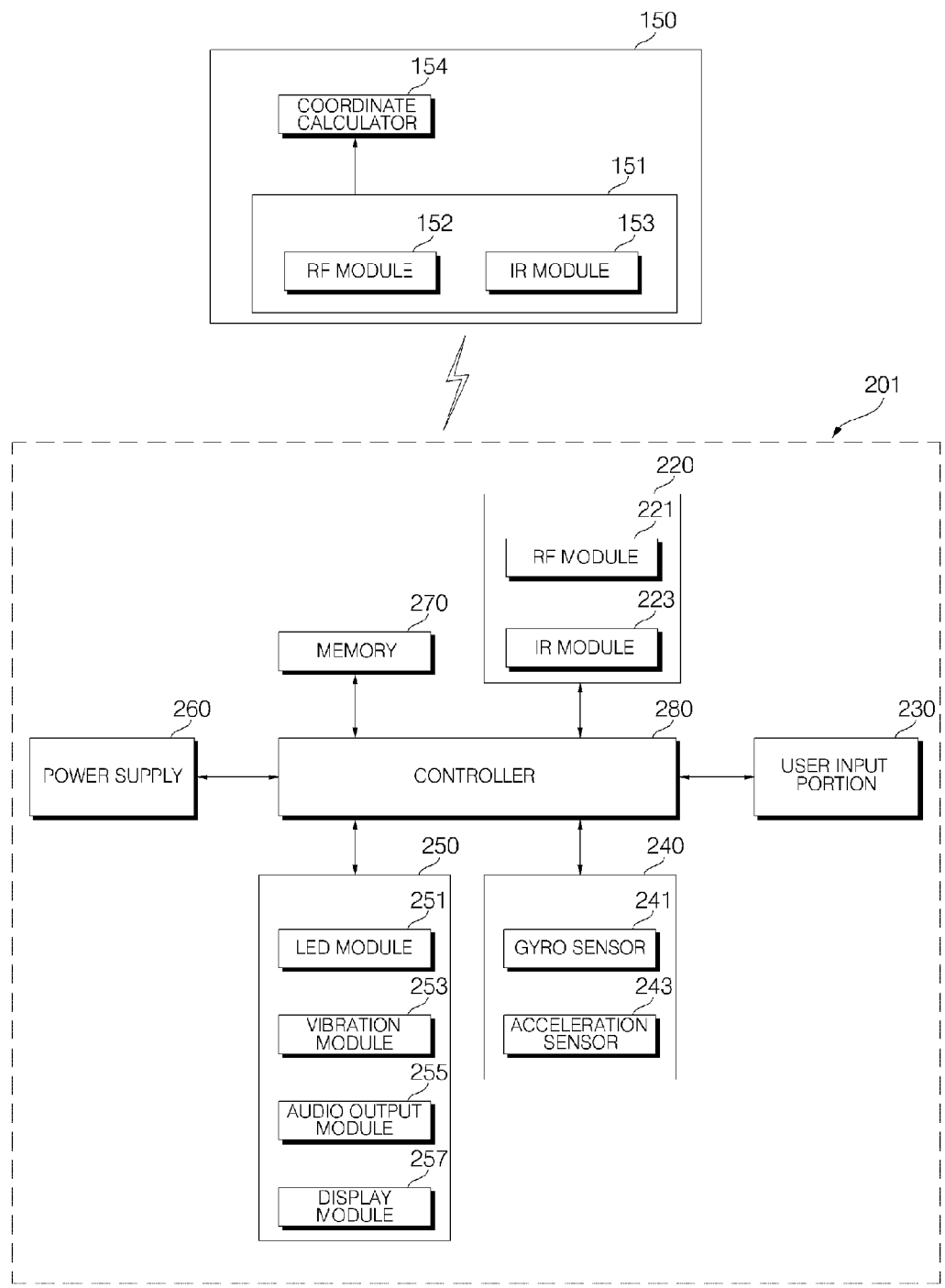
FIG. 3B is a block diagram of the pointing device 201 and the interface 150 of the image display device 100 according to an exemplary embodiment of the present invention.

FIG. 3B is a block diagram of an example of the pointing device 201 and the interface 150 of the image display device 100 according to an exemplary embodiment of the present invention. The pointing device 201 is an example of the remote control device 200.

Referring to FIG. 3B, the pointing device 201 may include a radio transceiver 220, a user input portion 230, a sensor portion 240, an output portion 250, a power supply 260, a memory 270, and a controller 280, all operably coupled.

The radio transceiver 220 transmits and receives signals to and from the image display device 100. In accordance with the embodiment of the present invention, the pointing device 201 may be provided with an RF module 221 for transmitting and receiving signals to and from the interface 150 of the image display device 100 according to an RF communication standard. Also, the pointing device 201 may include an IR module 223 for transmitting and receiving signals to and from the interface 150 of the image display device 100 according to an IR communication standard.

In accordance with the embodiment of the present invention, the pointing device 201 transmits signal carrying information about an operation of the pointing device 201 to the image display device 100 through the RF module 221. Also, the pointing device 201 may receive a signal from the image display device 100 through the RF module 221. Thus, the pointing device 201 may transmit commands associated with a power on/off, a channel switching, a volume change, etc. to the image display device 100 through the IF module 223.

Also, the user input portion 230 may include a keypad or buttons. The user may enter a command to the pointing device 201 by manipulating the user input portion 230 to an operation to be performed on the image display device 100. For example, if the user input portion 230 includes hard keys, the user may push the hard keys of the pointing device 201 for commands to be performed on the image display device 100. Furthermore, if the user input portion 230 is provided with a touch screen, the user may touch soft keys on the touch screen of the pointing device 201 for commands to be performed on the image display device 100. Also, the user input portion 230 may have a variety of input means which may be manipulated by the user, such as a scroll key, a jog key, etc., to which the present invention is not limited.

The sensor portion 240 may include a gyro sensor 241 or an acceleration sensor 243. The gyro sensor 241 may sense an operation of the pointing device 201. For example, the gyro sensor 241 may detect the directional information about an operation of the pointing device 201 along x, y and z axes. The acceleration sensor 243 may detect velocity information of the pointing device 201.

In accordance with the embodiment of the present invention, in the sensor portion 240, the gyro sensor 241 and the acceleration sensor 243 may be replaced with other sensors or other sensors may be included in addition to the gyro sensor 241 and the acceleration sensor 243, in order to detect positional and moving data and information associated with the pointing device 201. For example, the sensor portion 240 may include a geomagnetic sensor. In the geomagnetic sensor, three sensors for measuring a strength of a magnetic field are provided along X, Y and Z axes, and the direction of the magnetic field influencing the sensors may be measured by a sum of output vectors of the three sensors. Therefore, the movement of the pointing device 201 can be sensed based on a change in a magnetic field.

The output portion 250 may output a video or audio signal corresponding to a manipulation of the user input portion 230 or a signal transmitted by the image display device 100. The user may be aware from the output portion 250 whether the user input portion 230 has been manipulated or the image display device 100 has been controlled. For example, the output portion 250 may include a Light Emitting Diode (LED) module 251. The output portion 250 is illuminated when the user input portion 230 has been manipulated or a signal is transmitted to or received from the image display device 100 through the radio transceiver 220, a vibration module 253 for generating vibrations, an audio output module 255 for outputting audio, and/or a display module 257 for outputting video.

The power supply 260 supplies the power to the pointing device 201. When the pointing device 201 is kept stationary for a predetermined time, the power supply 260 blocks the power from the pointing device 201. When a predetermined key of the pointing device 201 is manipulated, the power supply 260 may resume a power supply.

The memory 270 may store a plurality of types of programs required for controlling or operating the pointing device 201, or application data. When the pointing device 201 transmits and receives signals to and from the image display device 100 wirelessly through the RF module 221, the pointing device 201 and the image display device 100 perform signal transmission and a signal reception in a predetermined frequency band. The controller 280 of the pointing device 201 may store information about the frequency band to wirelessly transmit and receive signals to and from the image display device 100 paired with the pointing device 201 in the memory 270, and the controller 280 may refer to the information.

The controller 280 provides an overall control to the pointing device 201. The controller 280 may transmit a signal corresponding to a predetermined key manipulation on the user input portion 230 or a signal corresponding to an operation of the pointing device 201 detected by the sensor portion 240 to the interface 150 of the image display device 100 through the radio transceiver 220.

Here, the interface 150 of the image display device 100 may include a radio transceiver 151 for wirelessly transmitting and receiving signals to and from the pointing device 201, and a coordinate calculator 154 for calculating the coordinates of the pointer 202 corresponding to an operation of the pointing device 201. Further, the interface 150 may transmit and receive signals wirelessly to and from the pointing device 201 through the RF module 152. The interface 150 may also receive a signal from the pointing device 201 through the IR module 153 based on the IR communication standard.

The coordinate calculator 154 may calculate the coordinates (x, y) of the pointer 202 to be displayed on the display 170 by correcting a handshaking or errors from a signal corresponding to an operation of the pointing device 201 received through the radio transceiver 151.

Thereafter, a signal received from the pointing device 201 through the interface 150 is provided to the controller 180 of the image display device 100. The controller 180 may identify information about an operation of the pointing device 201 or a key manipulation on the pointing device 201 from the signal received from the pointing device 201 and control the image display device 100 according to the identical information.

In another example, the pointing device 201 may calculate the coordinates of the pointer 202 corresponding to the operation of the pointing device and output the coordinates to the interface 150 of the image display device 100. The interface 150 of the image display device 100 may then transmit the received coordinate information to the controller 180 without correcting a handshaking or errors.

FIGS. 1 to 3B illustrate the image display device 100 and the pointing device 201 as the remote control device 200 according to an embodiment of the present invention. The components of the image display device 100 and the pointing device 201 may be integrated or omitted, or a new component may be added. For example, when needed, two or more components may be incorporated into a single component or one component may be configured to be divided into two or more separate components. Also, the function of each block is presented for illustrative purposes, not limiting the scope of the present invention.

Figure 4:
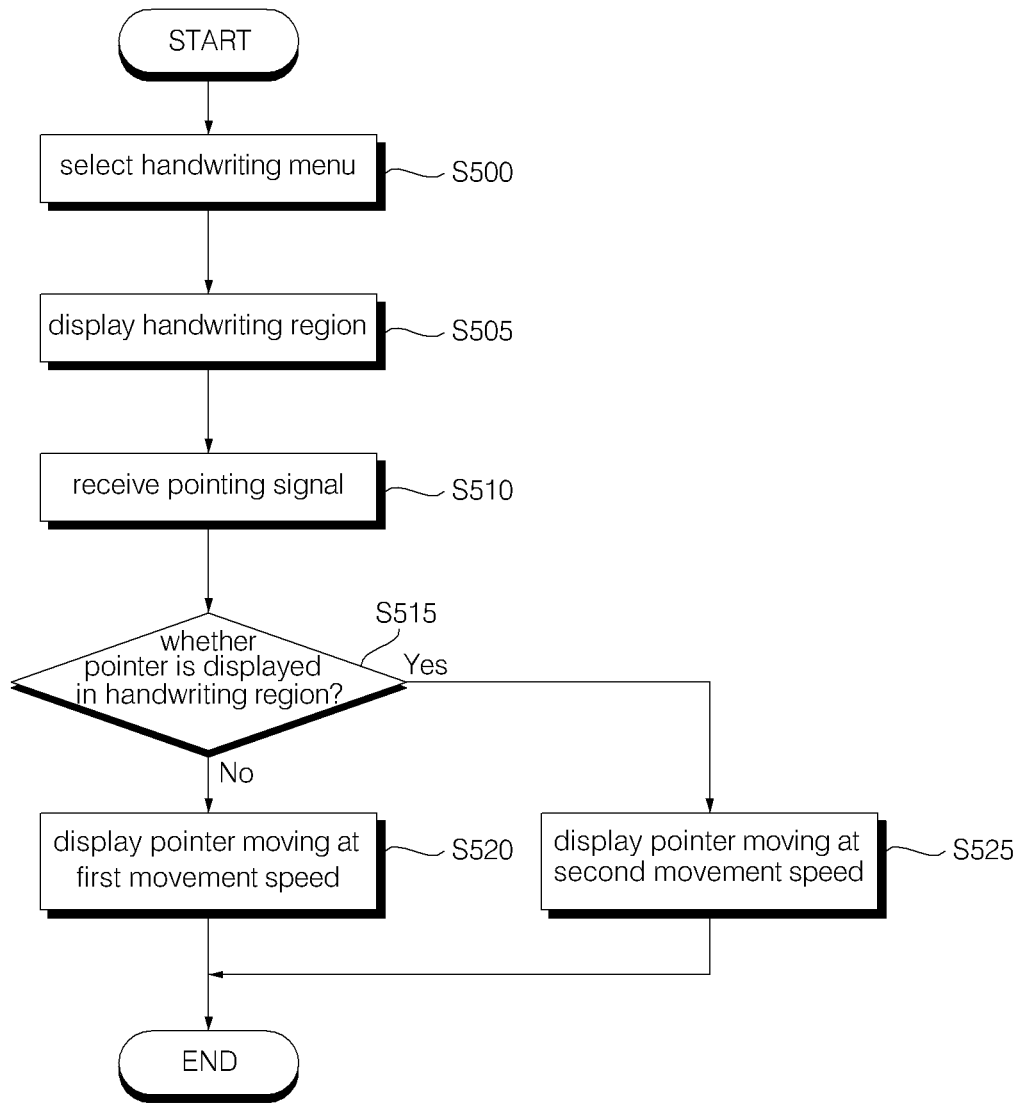
FIG. 4 is a flow chart illustrating a method for operating an image display device according to a first embodiment of the present invention.

FIG. 4 is a flow chart illustrating a method for operating an image display device according to a first embodiment of the present invention.

As shown in FIG. 4, a handwriting recognition menu is selected based on a user command (S500). For example, while a broadcast image is displayed on the display 170 of the image display device 100, a handwriting recognition menu icon may be selected according to a signal transmitted from the pointing device 201.

Upon selecting the handwriting recognition menu, the controller 180 displays a handwriting region on the display 170 (S505). The handwriting region may display a pointer 202 corresponding to a pointing signal or a trajectory of a pointing signal. The handwriting region may occupy all or a part of the display 170. The handwriting region may be displayed so as to opaquely overlap an image that is displayed on the display 170 of the image display device 100 in step S500.

The interface 150 then receives a pointing signal from the pointing device 201 (S510). Here, the pointing signal includes values output from the gyro sensor 241 and the acceleration sensor 243 included in the pointing device 201. When the pointing device 201 is in an active state, a pointing signal may be continuously transmitted from the pointing device 201. The pointing signal may be transmitted together with a selection signal from the pointing device 201. The selection signal is transmitted from the pointing device 201 to the wireless communication unit 151 when a user command is input through the user input portion 230.

The coordinate calculator 154 then calculates coordinates from the input pointing signal. The controller 180 displays a pointer 202 on the display 170 according to the calculated coordinates and determines whether or not the pointer 202 is displayed in the handwriting region (S515).

If it is determined that the pointer 202 is not to be displayed in the handwriting region (S515, No), the controller 180 controls the pointer 202 to move at a first movement speed and displays the same (S520). That is, the calculated coordinates of the received input pointing signal is outside the handwriting region. On the other hand, if it is determined that the pointer 202 is displayed in the handwriting region (S515, Yes), the controller 180 controls the pointer to move at a second movement speed and displays the same (S525). That is, the calculated coordinates of the received input pointing signal are inside of the handwriting region. The second movement speed may be slower than the first movement speed.

When the pointer 202 moves from first coordinates corresponding to a first pointing signal to second coordinates corresponding to a second pointing signal, the pointer 202 moves at unit intervals (or on a unit interval basis). Here, the movement speed of each unit interval varies according to the size of the unit interval. The size of the unit interval may vary depending on the unit interval of coordinates calculated by the coordinate calculator 154. The coordinate calculator 154 may adjust the unit interval of the coordinates using an appropriate scale factor. The size of the unit interval may be a reference for indicating the sensitivity of an image processing device to a pointing signal.

Accordingly, when the second movement speed is less than the first movement speed, a unit interval applied to a pointer 202 that moves at the second movement speed may be larger than a unit interval applied to a pointer 202 that moves at the first movement speed and the sensitivity of the pointer 202 moving at the first movement speed to a pointing signal may be higher than that of the pointer 202 moving at the second movement speed.

That is, the sensitivity of the image processing device to a pointing signal may change depending on the determination of 5515.

On the other hand, upon determining in step 5515 that the pointer 202 is displayed in the handwriting region such that the pointer 202 can move at the second movement speed, the controller 180 may change the format of the pointer 202 or may output an effect sound indicating that the pointer 202 has been displayed in the handwriting region or may transmit a signal, which allows the pointing device 201 to output a vibration, to the pointing device 201 through the interface 150. When the signal allowing the pointing device 201 to output a vibration is transmitted to the pointing device 201, the pointing device 201 may output a vibration through the vibration module 253 of the pointing device 201. That is, the controller 180 may perform a control operation to output effects such as visual, auditory, or tactile effects in order to distinguish between when the pointer 202 is displayed in the handwriting region and when the pointer 202 is displayed in a region other than the handwriting region.

Figure 5:
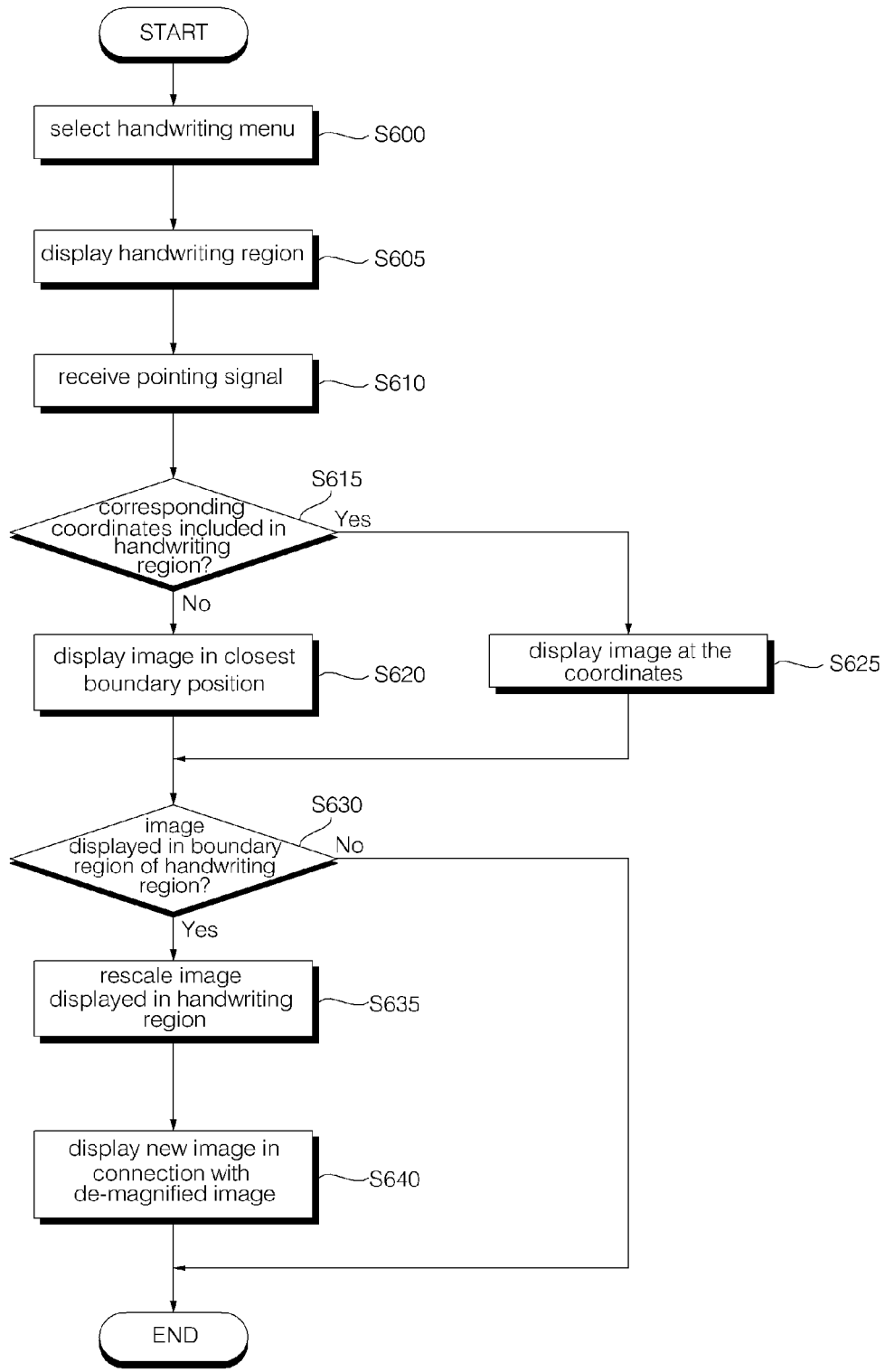
FIG. 5 is a flow chart illustrating a method for operating an image display device according to a second embodiment of the present invention.

FIG. 5 is a flow chart illustrating a method for operating an image display device according to a second embodiment of the present invention.

As shown in FIG. 5, a handwriting menu is selected based on a user command (S600) and the controller 180 displays a handwriting region on the display 170 (S605). The interface 150 continuously receives a pointing signal (or pointing signals) from the pointing device 201 (S610). The coordinate calculator 154 calculates coordinates from the received pointing signal. The controller 180 determines whether or not the calculated coordinates are included in the handwriting region (S615).

If it is determined that the calculated coordinates are not included in the handwriting region (S615, No), the controller 180 displays an image corresponding to the pointing signal in a boundary position closest to the calculated coordinates in a boundary region of the handwriting region (S620). That is, if the coordinates of the image are outside the handwriting region, the image may be displayed at the boundary of the handwriting region to which the coordinates of the image is closest. On the other hand, if it is determined that the calculated coordinates are included in the handwriting region (S615, Yes), the controller 180 displays the image at the calculated coordinates (S625). Thus, when the calculated coordinates correspond to a boundary region of the handwriting region, the controller 180 displays the image in the boundary region corresponding to the calculated coordinates. The controller 180 may display a pointer 202 in response to a pointing signal and a pointer 202 displayed in the handwriting region may move at a movement speed different from a pointer 202 displayed outside the handwriting region.

Here, the handwriting region meets regions other than the handwriting region at the boundary region of the handwriting region and the range of the boundary region may be set differently depending on a user or a manufacturer.

The image corresponding to the pointing signal that is displayed in steps S620 and S625 may be dots. Accordingly, when a pointing signal is continuously input, the image may be displayed in the handwriting region depending on the determination made in step S615. Further, when the images corresponding to the continuously inputted pointing signals are dots, the dots may be connected to be displayed as a line.

Thereafter, the controller 180 determines whether or not the image is displayed in a boundary region of the handwriting region (S630). If the image is displayed in a boundary region of the handwriting region (S630, Yes), the controller 180 rescales and displays a set of images displayed in the handwriting region according to a pointing signal continuously input in step S610 (S635).

That is, when the image is displayed in a boundary region of the handwriting region, images displayed according to a previously input pointing signal are rescaled to enlarge a region, in which no image is displayed, in the handwriting region so that the user can continuously input a pointing signal that can be displayed in the handwriting region regardless of the size or resolution of the handwriting region. In other words, when the coordinates of the pointing signal are outside the handwriting region, the coordinates are pulled into the boundaries of the handwriting region closest to the pointing signal. Then, the region of the handwriting region closest to the pointing signal is zoomed out and the previous and current images of the pointing signal would be all displayed in the handwriting region. Thus, the resealing step functions similar to a zoom-out function are performed. The user can also check, in real time, whether or not a pointing signal is being correctly input as intended by the user. The controller 180 then displays a new image according to the input pointing signal in connection with the set of images rescaled in step S635 (S640).

Figure 6:
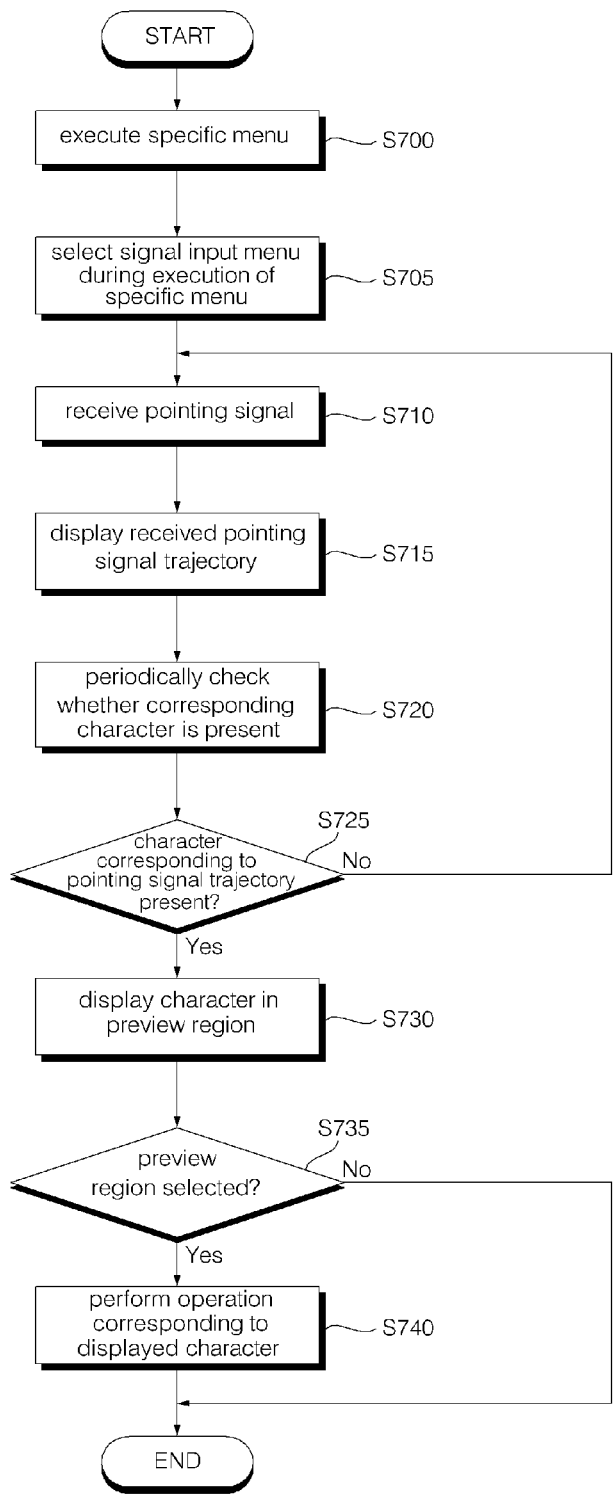
FIG. 6 is a flow chart illustrating a method for operating an image display device according to a third embodiment of the present invention.

FIG. 6 is a flow chart illustrating a method for operating an image display device 100 according to a third embodiment of the present invention.

As shown in FIG. 6, the controller 180 executes a specific menu (S700). This specific menu may be any menu, which may be executed on the image display device 100, such as, for example, a broadcast image display, a video play, and a music play.

A signal input menu is then selected based on a user command (S705). Upon selecting the signal input menu, the controller 180 displays a preview region on the display 170. The image display device 100 may receive a pointing signal from the pointing device 201 and display an image corresponding to the received pointing signal on the display 170 of the image display device 100 and may display a handwriting region in which the input signal can be displayed when the signal input menu is selected.

The interface 150 then continuously receives a pointing signal from the pointing device 201 (S710). Then, the coordinate calculator 154 calculates coordinates from the received pointing signal and the controller 180 displays a trajectory of received pointing signals on the display 170 in a chronological order in which the pointing signals are received (S715). A pointer 202 may be displayed at the calculated coordinates.

The controller 180 then periodically checks whether or not a character corresponding to all or a part of the pointing signal trajectory displayed in step 5715 is present (S720). Then, the controller 180 checks whether or not the displayed pointing signal trajectory is a part of a specific character and identifies the specific character. The controller 180 may identify a character corresponding to a character recognition rule that has been previously stored in the memory 160 or the controller 180. The character recognition rule may include Korean letters (or words), numbers, English letters (or words), and symbols.

Even when a pointing signal that has been discontinuously input, the discontinuously input pointing signal may be a part of the previously input pointing signal, if the discontinuously input pointing signal has been input within a predetermined time from a previously input pointing signal. When a combination of discontinuous pointing signals forms a single character or a single word, the predetermined time may be a time interval between the discontinuous pointing signals.

That is, a pointing signal that is re-input within the predetermined time after a first pointing signal is input may be considered as a signal continuously connected to the first pointing signal. Accordingly, a trajectory of pointing signals in step S720 may include a trajectory of pointing signals discontinuously input within the predetermined time.

The controller 180 then determines whether or not a character corresponding to the pointing signal trajectory is present (S725). When a character corresponding to the pointing signal trajectory is present (S725, Yes), the controller 180 displays the character in a preview region (S730).

On the other hand, when no character corresponding to the pointing signal trajectory is present (S725, No), the controller 180 continuously receives pointing signals in step S710 and repeatedly performs steps S710 to S720 until a character corresponding to the pointing signal trajectory is present.

When the character corresponding to the pointing signal trajectory is displayed in the preview region in step S730, the controller 180 determines whether or not the preview region has been selected (S735). The preview region may be selected according to a selection signal transmitted from the pointing device 201.

If a preview region has been selected (S735, Yes), the controller 180 performs an operation corresponding to the character displayed in the preview region (S740). For example, when the character displayed in the preview region is a number, broadcast channel change may be performed according to the number or a menu whose shortcut is the number may be executed. When the characters displayed in the preview region are Korean or English words, a program whose title matches the Korean or English words may be executed and a menu whose shortcut is the Korean or English word may be executed. The menu whose shortcut is the Korean or English words includes any menu (or a menu item) that can be executed on the image display device 100.

The operation that is performed in step S740 may change according to the specific menu executed in step S700. For example, when the specific menu executed in step S700 is a broadcast display menu and the character displayed in the preview region is '5', current channel may be changed to channel 5. On the other hand, when the specific menu executed in step S700 is a music playback menu and the character displayed in the preview region is '5', a music file whose title is 5 may be executed or an audio volume may be changed to a volume level of 5.

Figure 7:
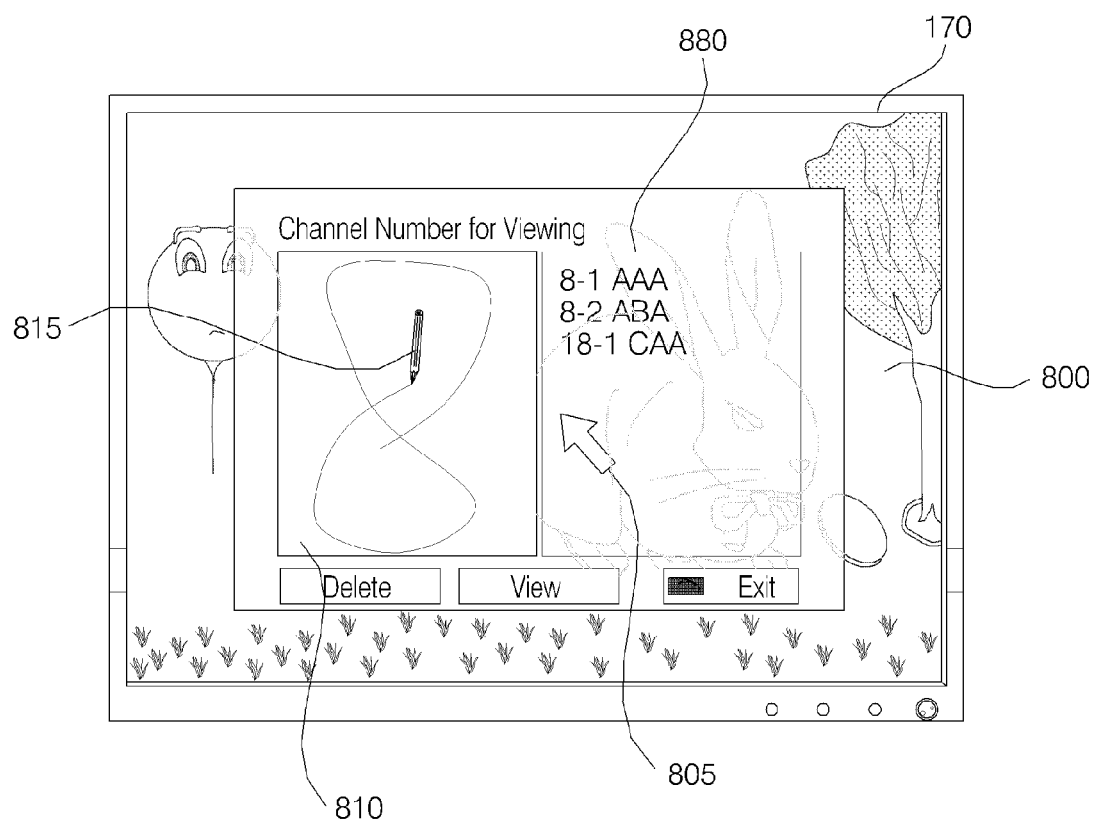
FIG. 7 illustrates a method for operating an image display device according to the first embodiment of the present invention together with a screen displayed on a display.

FIG. 7 illustrates a method for operating an image display device according to the first embodiment of the present invention together with a screen displayed on a display.

As shown in FIG. 7, when a handwriting recognition menu is executed with a broadcast image 800 being displayed, a handwriting region 810 is displayed on a display 170 of the image display device 100 so as to overlap the broadcast image 800. The handwriting region 810 may be displayed transparently, translucently, or opaquely.

In addition, when a handwriting input is made in the handwriting region 810, a list region 880, which displays an information list associated with a character corresponding to the handwriting input, may be displayed on the display 170 of the image display device 100 so as to overlap the broadcast image 800. The list region 880 may be displayed transparently, translucently, or opaquely.

Although the handwriting region 810 and the list region 880 may be displayed separately, the handwriting region 810 and the list region 880 are displayed together in the example illustrated in FIG. 7.

In the illustrated example, when the handwriting menu is executed while displaying the broadcast image 800 on the display 170 of the image display device 100 and the handwriting input made in the handwriting region 810 is a trajectory input similar to number 8, a channel list associated with the number 8 is displayed in the list region 880.

Specifically, channel numbers and channel names associated with the number 8 may be displayed together. This allows the user to easily select a desired channel number among the channels displayed in the list region 880. Items displayed in the list region may change depending on the execution state of the handwriting menu.

On other hand, when the handwriting menu is displayed on the display 170 of the image display device 100 with an application menu being displayed on the display 170, a list of application menu items associated with a number input to the handwriting region may be displayed in the list region. In addition, when the handwriting menu is displayed with a content play list being displayed, a list of content items associated with a number input to the handwriting region may be displayed in the list region.

Information corresponding to an image that is displayed when or before the handwriting region 810 is displayed is collected and the collected information is displayed in the list region in the above manner, thereby allowing the user to easily identify associated information.

When the coordinates corresponding to the pointing signal are not included in the handwriting region 810, for example, when the coordinates corresponding to the pointing signal are included in the list region 880, a pointer 805 having a first movement speed is displayed in a region outside the handwriting region 810, i.e., in the list region 880.

On the other hand, when the coordinates corresponding to the pointing signal are included in the handwriting region 810, a pointer 815 having a second movement speed is displayed in the handwriting region 810. Here, the pointer 815 having the second movement speed has a changed shape or form in order to distinguish the movement speed of the pointer 805. This allows the user to intuitively determine that the pointer has entered the handwriting region or the list region.

Figure 8:
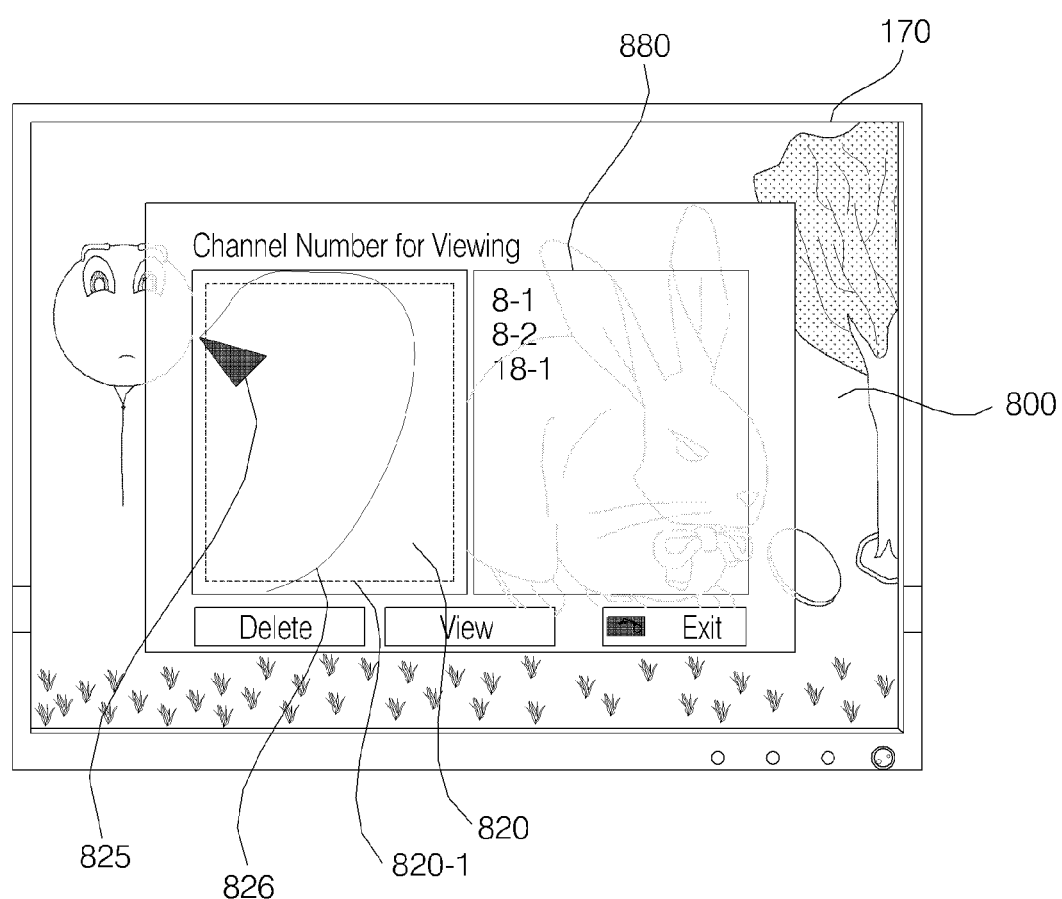
FIGS. 8 and 9 illustrate a method for operating an image display device according to the second embodiment of the present invention together with a screen displayed on a display.
Figure 9:
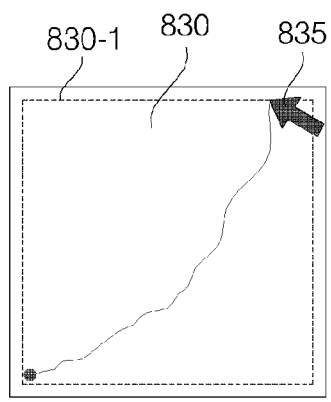
Figure 9:
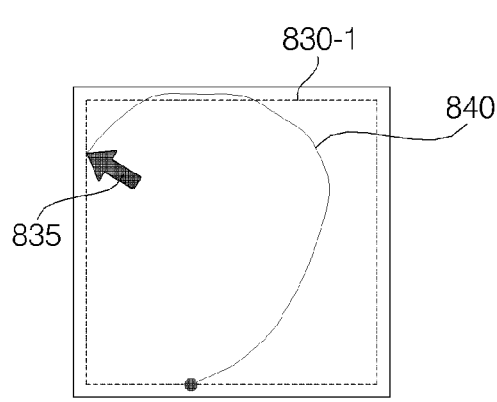
Figure 9:
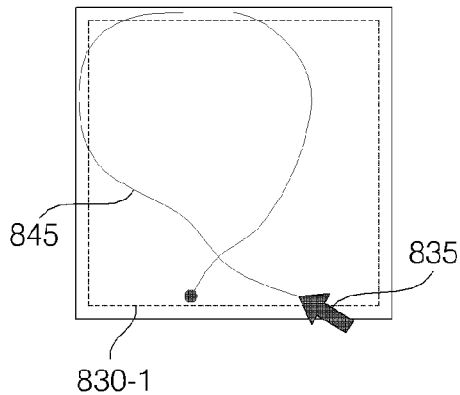
Figure 9:
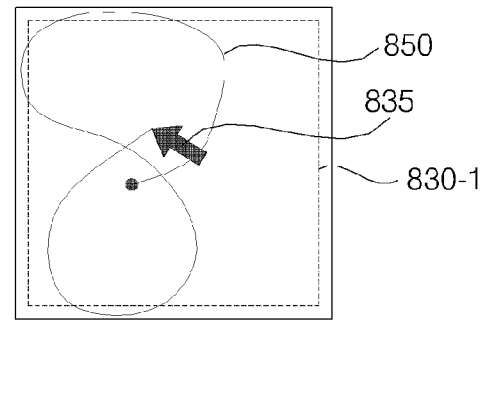

FIGS. 8 and 9 illustrate a method for operating an image display device 100 according to the second embodiment of the present invention together with a screen displayed on a display 170 of the image display device.

As shown in FIG. 8, when a handwriting recognition menu is executed while displaying a broadcast image 800 on the display 170 of the image display device 100, a handwriting region 820 and a list region 880 are displayed to overlap the broadcast image 819. The handwriting region 820 includes a boundary region 820-1 of the handwriting region 820. The list region 880 displays an information list associated with a character corresponding to a handwriting input that is made in the handwriting region 820.

A dot is displayed according to coordinates corresponding to a received pointing signal and a line 826 connecting a set of dots is displayed according to continuously input pointing signals. The line 826 is displayed only in the handwriting region 820.

When the coordinates corresponding to the received pointing signal are not included in the handwriting region 820, a corresponding dot is displayed in a boundary position of the display 170 closest to the coordinates in a boundary region 820-1 of the handwriting region. Accordingly, a line may be displayed in the boundary region 820-1 of the handwriting region according to a continuously received pointing signal.

As shown in FIG. 9(*a*), a handwriting region 830 and a boundary region of the handwriting region 830 are displayed and a pointer 835 corresponding to the pointing signal is displayed.

As shown in FIG. 9(*b*), when the coordinates corresponding to the received pointing signal are not included in the handwriting region 830, a dot is displayed in a boundary position closest to the coordinates in the boundary region 830-1 of the handwriting region while a line 840, which is a set of dots that have been displayed according to previously received pointing signals, is resealed and displayed.

When a pointing signal is continuously input, a line 845 is displayed in connection with the resealed line 840 as shown in FIG. 9(*c*). When coordinates corresponding to the pointing signal are not included in the handwriting region 830, a dot is displayed in a boundary position closest to the coordinates in the boundary region 830-1 of the handwriting region while a line 845, which is a set of dots that have been displayed according to previously received pointing signals, is resealed and displayed.

Since a line corresponding to repeatedly input pointing signals is resealed, the user can input a line 850 matching their intention while viewing and/or confirming the line without being limited by the size of the handwriting region 830 as shown in FIG. 9(*d*).

Figure 10:
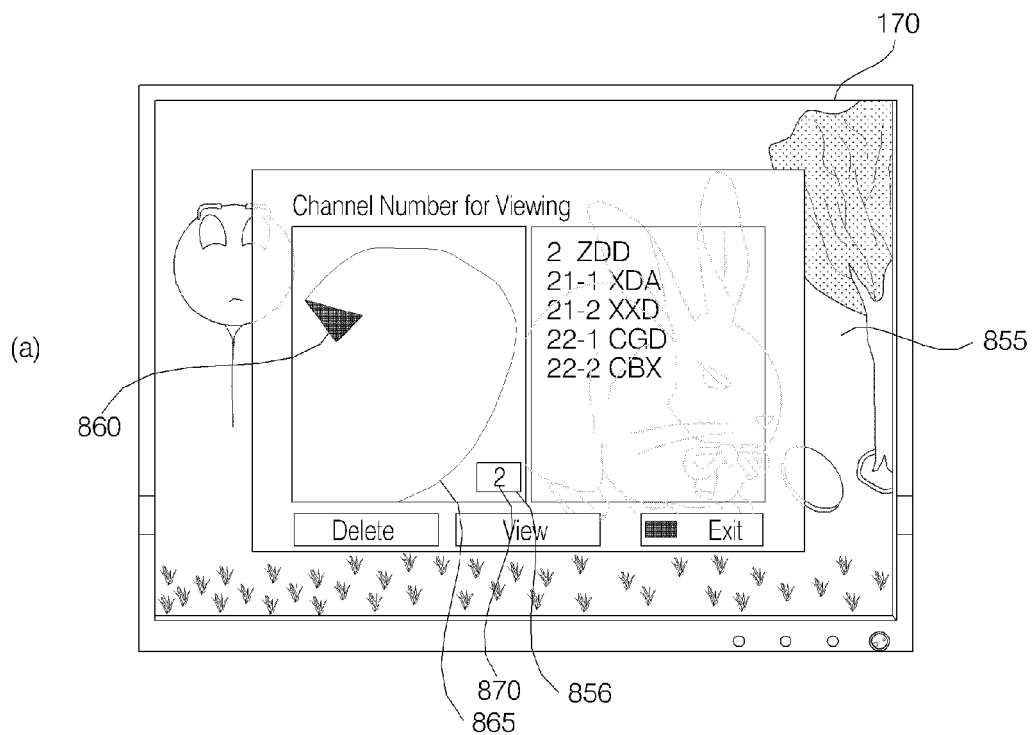
FIG. 10 illustrates a method for operating an image display device according to the third embodiment of the present invention together with a screen displayed on a display.
Figure 10:
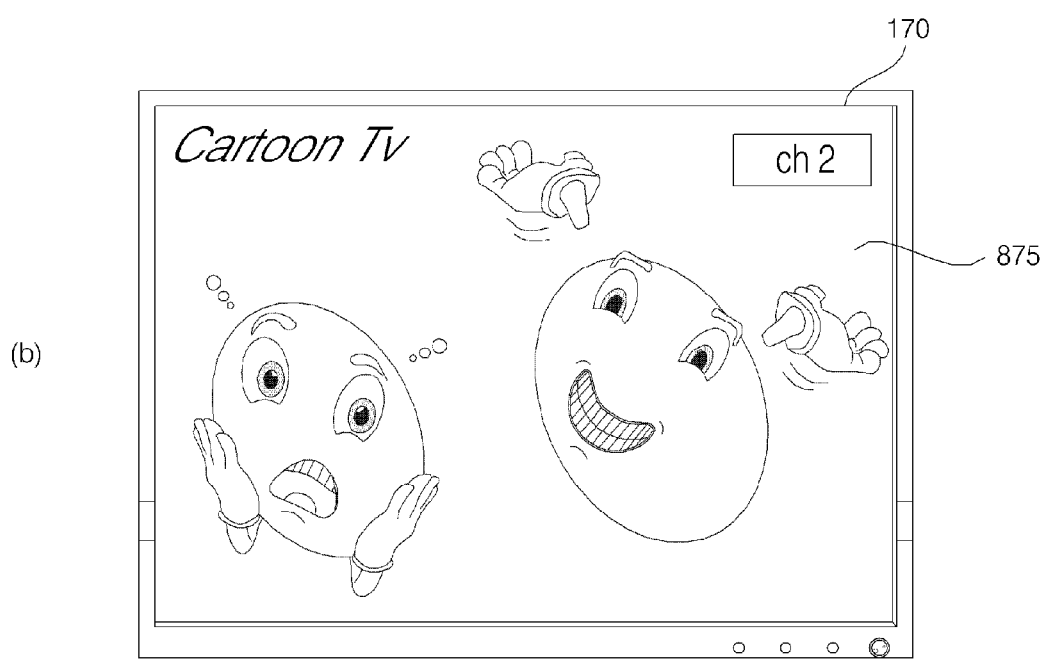

FIG. 10 illustrates a method for operating an image display device 100 according to the third embodiment of the present invention together with a screen displayed on a display 170 of the image display device 100.

As shown in FIG. 10(*a*), a broadcast display menu is executed to display a broadcast image 855. Here, when a signal input menu is executed, a handwriting region 810 and a list region 880 are displayed. A preview region 856 which previews a character input to the handwriting region 810 may be displayed on the display 170 of the image display device 100.

A pointer 860 is displayed according to a pointing signal input to the handwriting region 810 and a trajectory 856 of pointing signals is displayed in a chronological order in which the pointing signals are received. When a character, a part of which matches the pointing signal trajectory 856, is identified by a periodic checking of the pointing signal trajectory 865, the identified character 870 is displayed in the preview region 856. A list of information items associated with the character corresponding to the identified character is displayed in the list region 880.

As shown in FIG. 10(*b*), when the preview region 856 in which the character 870 is displayed is selected during execution of the broadcast display menu, broadcast channel is changed to a channel corresponding to the character 870 and a broadcast image 875 corresponding to the changed channel is displayed.

As it is apparent from the above description, an image display device and a method for operating the same according to the present invention have a variety of advantages. For example, it is possible to provide a convenient handwriting recognition method to the user.

Specifically, the coordinates included in the handwriting region and the coordinates not included in the handwriting region are distinguished from each other. As a result, different movement speeds or different shapes, of the pointer are applied based on the distinguished coordinates, thereby allowing the user to easily identify the handwriting region. It is also possible to allow the user to easily perform a handwriting operation taking into an account of an error due to a hand shaking of the user when making a handwriting input to the handwriting region.

Further, when coordinates corresponding to a pointing signal are not included in the handwriting region, an image is displayed a boundary position closest to the coordinates in a boundary region of the handwriting region, thereby allowing the user to easily perform the handwriting.

Furthermore, whether or not an image such as a character, a number, or a symbol corresponding to a pointing signal trajectory is present is determined and the image is displayed in a preview region upon determining that the image is present, thereby allowing the user to easily identify details of the handwriting.

Moreover, information associated with an image corresponding to a received pointing signal is collected and the collected information is displayed in a list region, thereby allowing the user to easily identify the associated information.

The embodiments of the present invention can be embodied as processor readable code(s) stored in one or more processor readable media provided in an image display device. The processor readable medium includes any type of storage device that stores data which can be read by a processor. Examples of the processor readable medium include a Read Only Memory (ROM), a Random Access Memory (RAM), CD-ROMs, magnetic tapes, floppy disks, optical data storage devices, and so on. The processor readable medium can also be embodied in the form of carrier waves such as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for operating an image display device using a pointing device, the method comprising:
    displaying, on a display of the image display device, a handwriting region;
    receiving a pointing signal from the pointing device;
    displaying a pointer on the pointing signal;
    determining whether a location of an image based on positional information corresponding to the received pointing signal is included in the handwriting region;
    displaying the image corresponding to the received pointing signal at a boundary area of the handwriting region closest to the location when the location of the image is determined to be not included in the handwriting region; and
    transmitting a signal allowing an output of a vibration to the pointing device or outputting an effect sound when the pointer is moved from outside of the handwriting region to inside the handwriting region or from inside of the handwriting region to outside the handwriting region.

2. The method according to claim 1, further comprising:
    rescaling the image to fit within the handwriting region and displaying the rescaled image in the handwriting region when the location of the image is determined to be not included in the handwriting region.

3. The method according to claim 1, further comprising:
    displaying the image at a particular region of the handwriting region according to the positional information when the location of the image is determined to be included in the handwriting region.

4. The method according to claim 1, wherein the pointing signal includes information about movement of the pointing device, and
    wherein the pointing signal is wirelessly received through an RF module.

5. The method according to claim 1, further comprising:
    determining whether a trajectory of the image associated with the received pointing signal corresponds to a particular image;
    collecting information associated with the particular image when the trajectory is determined to be corresponding to the particular image; and
    displaying the collected information in a list region of the display,
    wherein the list region is different from the handwriting region.

6. The method according to claim 5, wherein the particular image includes a specific character, a part of a specific character or a string of characters.

7. A method for operating an image display device using a pointing device, the method comprising:
    displaying, on a display of the image display device, a handwriting region;
    receiving a pointing signal from the pointing device;
    displaying a pointer based on the pointing signal;
    determining whether or not a pointing signal trajectory corresponds to a specific character;
    displaying a list of operations associated with the specific character on an area adjacent to the handwriting region when the pointing signal trajectory is determined to correspond to the specific character; and
    transmitting a signal allowing an output of a vibration to the pointing device or outputting an effect sound when the pointer is moved from outside of the handwriting region to inside the handwriting region or from inside of the handwriting region to outside the handwriting region.

8. The method according to claim 7, further comprising:
    performing an operation from the list of operations associated with the specific character in response to a selection signal.

9. The method according to claim 7, wherein the pointing signal trajectory is a trajectory of discontinuously received pointing signals as long as a combination of the trajectory of the discontinuously received pointing signals forms the specific character.

10. The method according to claim 7, wherein the pointing signal includes information about movement of the pointing device, and
    wherein the pointing signal is wirelessly received through an RF module.

11. The method according to claim 7, further comprising:
    determining whether a location of the pointer associated with the pointing signal trajectory corresponds to inside of the handwriting region based on positional information; and
    displaying a first pointer moving at a first movement speed according to the pointing signal when the location is determined to be outside of the handwriting region, or
    displaying a second pointer moving at a second movement speed according to the pointing signal when the location is determined to be inside the handwriting region.

12. The method according to claim 11, wherein the second movement speed is less than the first movement speed.

13. The method according to claim 11, wherein the second pointer has a different shape from the first pointer.

14. A method for operating an image display device using a pointing device, the method comprising:
- displaying, on a display of the image display device, a handwriting region;
- receiving a pointing signal from the pointing device;
- displaying a pointer based on the pointing signal;
- determining whether or not a pointing signal trajectory on the handwriting region corresponds to at least a part of multiple characters;
- displaying a list of operations associated with the multiple characters on an area adjacent to the handwriting region when the pointing signal trajectory corresponds to the at least part of multiple characters;
- updating the list of operations on the area adjacent to the handwriting region as the pointing signal trajectory changes; and
- transmitting a signal allowing an output of a vibration to the pointing device or outputting an effect sound when the pointer is moved from outside of the handwriting region to inside the handwriting region or from inside of the handwriting region to outside the handwriting region.

15. The method according to claim 14, further comprising:
- performing an operation from the list of operations associated with the at least part of multiple characters in response to a selection signal.

16. The method according to claim 14, wherein the pointing signal trajectory is a trajectory of discontinuously received pointing signals as long as a combination of the trajectory of the discontinuously received pointing signals forms the at least part of multiple characters.

17. The method according to claim 14, wherein the pointing signal includes information about movement of the pointing device, and
- wherein the pointing signal is wirelessly received through an RF module.

18. The method according to claim 14, further comprising:
- determining whether a location of the pointer associated with the pointing signal trajectory corresponds to inside of the handwriting region based on positional information; and
- displaying a first pointer moving at a first movement speed when the location is determined to be outside of the handwriting region, or
- displaying a second pointer moving at a second movement speed when the location is determined to be inside the handwriting region.

19. The method according to claim 18, wherein the second movement speed is less than the first movement speed.

20. The method according to claim 18, wherein the second pointer has a different shape from the first pointer.

* * * * *